Dec. 29, 1931. G. H. FRASER 1,838,380
DRIVE AND DRIVEN DEVICE FOR VEHICLES, ETC
Original Filed Sept. 12, 1924
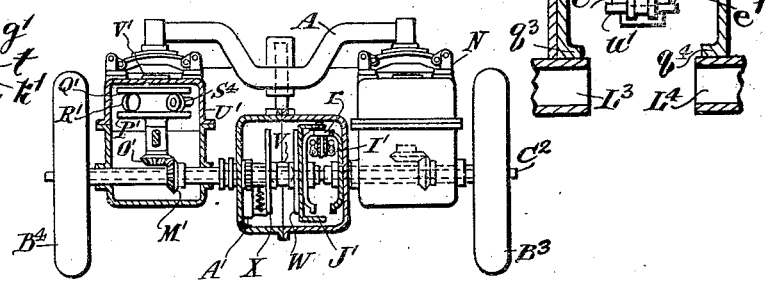
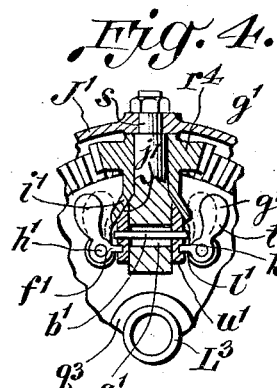
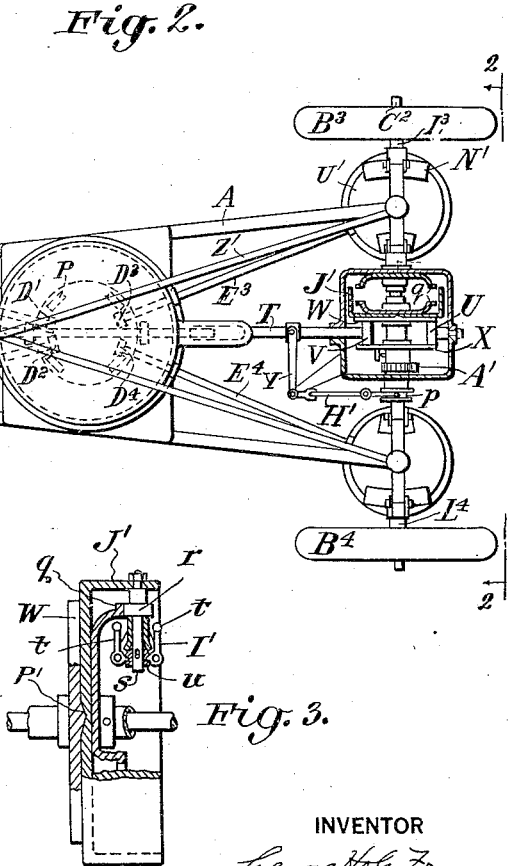
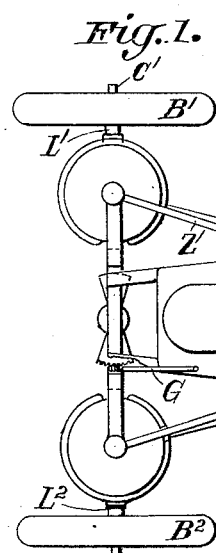
INVENTOR
George Holt Fraser Patented Dec. 29, 1931

1,838,380

UNITED STATES PATENT OFFICE

GEORGE HOLT FRASER, OF BROOKLYN, NEW YORK

DRIVE AND DRIVEN DEVICE FOR VEHICLES, ETC.

Application filed September 12, 1924, Serial No. 737,414. Renewed June 12, 1930.

This invention relates to driving mechanism and to driven devices, and aims to provide certain improvements therein.

It especially relates to differential motion devices, and in its preferred form provides improved means for such devices and improved apparatus in which said devices are utilized.

The invention aims to increase the efficiency and availability of said means and devices and to improve their construction and operation.

To this end in carrying out the preferred adaptation of my present improvements I provide improved reciprocal and intermediate parts in a differential motion arrangement and provide improved means for automatically resisting undue differential motion thereof; and I provide various other features of improvement in the construction, arrangement and use of said improvements which will be hereinafter more fully set forth.

My present improvements are applicable to a wide range of mechanical devices and can be applied to many transmission uses, but for purposes of illustration I will describe them in their preferred form as applied to the preferred form of my improved self propelled vehicle with reference to the accompanying drawings in which;

Fig. 1 is a plan view of a motor vehicle partly in horizontal section on the plane of the rear axle.

Fig. 2 is a fragmentary vertical transverse section approximately on the lines 2—2 in Fig. 1 and looking in the direction of the arrow; and Fig. 3 is a fragmentary enlarged view of the differential partly in section on the axis of one of the pinions.

Fig. 4 is an enlarged fragmentary face view of one of a pair of differential gear wheels, showing the orbital gear pinion and its sliding clutch in axial section, and its non-rotative axial stud partly broken away in vertical axial section in a plane at right angles to the plane on which the section of Fig. 3 is cut, and showing the clutch and centrifugal levers in their retardation positions, and Fig. 5 is a fragmentary enlarged side elevation of the orbital pinion and clutch, showing the differential gears and the master member fragmentarily in vertical axial section in a plane at right angles to that on which the section of Fig. 4 is cut.

Referring especially to Figs. 1 to 3 I will now describe the preferred form of my invention as applied to a self propelled vehicle.

Referring to the drawings let A represent the main frame or chassis of an automobile, B1, B2, B3, B4 the four wheels thereof, C1 the front axle and C2 the rear axle thereof, D the driving gear thereof, E the engine or motor thereof, P the transmission mechanism thereof, and G the steering gear therefor.

These parts may be of any usual or suitable construction for operating, guiding and controlling a car. The engine may be of the internal combustion or other type, that shown being an explosive engine having the usual fly wheel crankshaft J, from the revolution of which motion should be communicated to the shaft K and the driving wheels when and as and at such variable speed from time to time as is required.

Preferably I provide an axially movable shaft T and on the rear end of the shaft T I preferably provide a traction roller V tractionally engaging the side traction face of a wheel W for revolving it. Spaced from the wheel W is a reverse wheel X having a side traction face opposed to that of the wheel W and the roller V engages and is sustained between these faces, which are spaced and sustained by one or more idler rollers U.

Thus the revolution of the shaft T is transmitted to the wheel W at a speed depending on its position radially of the wheel W, and variable as this position is varied. Shifting the transmission varying lever Y to move the roller V varies the speed of the wheel W.

For the ordinary divided rear axle with which a differential is used to permit independent revolution of the rear wheels, preferably according to my invention I make the wheel W with a ring or flange on which the three radial pinions of the differential are mounted between their opposed gears, and in such case my invention provides preferably for using traction rollers and traction faces for the elements of the differential and improved means preferably for automatically retarding revolution of the pinions about their own axes in case of undue independent movement of the opposed traction faces reciprocal to them, so as to more or less resist their independent movement and thus prevent or resist skidding or spinning of one wheel relatively to the other, as will be more fully hereinafter described.

My invention preferably provides for automatically regulating the speed of revolution of the driving wheels of the vehicle, and this is preferably effected at the differential and so as to not impair the freedom for relative movement of the different wheels while controlling their aggregate speed, and I preferably do this by applying a centrifugal governor A' to the wheel X and utilize this to axially move a grooved collar p engaging one end of the lever H' for automatically shifting the shaft T to vary the roller V as is necessary to diminish the speed of the wheel W when this exceeds a predetermined limit.

My invention preferably provides for utilizing the driving stress or load as a means for generating the tractional engagement between the traction faces, and I preferably do this by dividing the wheel W and the differential flange or cup J' and connecting these by a driving connection serving to utilize the driving stress between them to generate an axial force for pressing on the wheel W toward its driving roller V. This may be done by any suitable means, but I prefer to provide oppositely inclined wedges or faces p' on these portions slidingly engaging to cause them to rotate together, but capable of wedging action tending to displace them axially so that the driving stress is transmitted from one to the other part through these cam like faces which tend to convert it into an axial stress to increase the tractional engagement between the wheel W and its roller V.

According to my invention improved control of differential revolution (relatively to the radial axis of the orbital pinion) of the two driven differential wheels with their axles is provided, preferably axially movable of one of the revolving parts and centrifugally restrained axially of such part from resisting differential revolution during normal revolution of the driven parts and operating during differential revolution of the driven parts to resist such differential revolution. This may be provided for in any suitable way, but preferably I poise the resisting means axially of its revolving part by counterpoising it between counter-acting levers t or centrifugal means revolving about the axle of the driven parts during their normal revolution and then centrifugally actuated to hold the resisting means in the inactive position, and centrifugally moved during differential revolution and then permitting the resisting means to move into the active position. Preferably the differential pinions are automatically controlled by improved governing means I' to arrest or retard their rotation around their respective axes to prevent or resist independent revolution of the driven member or differential wheels q between which the pinions operate. Preferably these wheels have opposed side traction faces and the pinions r have edge traction faces between and tractionally engaging these side faces. The pinions are orbital members revolving around the axis of the driven members and preferably are rotative on the radial studs s projecting within the flange of the master member or driving cup or wheel J', and are normally free to turn on their axes or studs to permit relative movement of the wheel q required for normal differential operation, but should one wheel q cease revolving and the other consequently revolved at double speed as the pinions revolve with the cap J' they would be caused to rotate about their own axes to meet this condition, and according to one feature of my invention I provide improved means for resisting their individual rotation, preferably by utilizing it to centrifugally retard them so that the retarding force applied to them will tend to compel revolution of the idle wheel. This can be done in any suitable manner, but I prefer to provide each pinion with one or more centrifugal levers t swinging centrifugally when the pinion rotates on its own axis and then operating a friction clutch or brake u' to resist or prevent such rotation of its pinion, thus to the extent of such resistance to tend to compel both wheels of the differential to revolve together. Thus slipping of either wheel will be automatically resisted, and their free independent revolution will be prevented so that each may be assured of exerting a driving force, and tendency of skidding and the requirements for non-slipping chains will be reduced.

As shown the centrifugal lever t is fulcrumed to the orbital roller r to swing centrifugally from an axis other than the axis of rotation of this roller and preferably distant from and at right angles to the axis of the roller so that when their weighted ends swing the other ends of the levers will generate motion axially of the roller and cause the brake u' to clutch the roller axially.

Preferably the centrifugal levers t are fulcrumed inwardly of their weighted ends so that as they revolve with the revolution of the cup J' centrifugal force will act to swing their weighted ends toward the stud *s* to release the brake and to hold them and the brake in an inactive position until such time as individual revolution of the orbital roller generates sufficient centrifugal force in the weighted ends of the levers to overcome the centrifugal action of their normal revolution.

Thus my automatic centrifugal means in their preferred form are poised between a centrifugal releasing stress incident to the revolution of the member J′ and another centrifugal brake actuating stress incident to the individual revolution of the orbital rollers so that they serve to both release the brake and hold it inactive at one time and to apply it at another time and act automatically in either contingency to suit varying conditions.

The clutch *u*′ preferably slides axially of the orbital wheel and exerts a forcible or positive clutching or braking action to more or less non-rotatably engage it with its stud *s*.

As shown one of the parts is constructed with a recess or slot and the other with a pin or stud to non-rotatively feather the brake *u*′ to the stud *s*, and the centrifugal action causes the pin to move in the recess to lock the parts against rotation when the pin is moved by centrifugal action of the governing weights.

My invention is shown as applied to a vehicle driving each of the four wheels B1, B2, B3, B4 at identical speeds when their axes are parallel and at suitably varied different speeds as these axes are moved out of parallelism for turning the vehicle. Preferably the right front wheel B1, is fixed on its tubular shaft L1, and the left front wheel B2 is fixed on its tubular shaft L2, and these shafts are mounted to revolve on the pivotally mounted front axle C1, which can swing on its vertical axis to steer the vehicle. Preferably the rear right wheel B3 is fixed on its tubular shaft L3 and the rear left wheel is fixed on its tubular shaft L4, and these are mounted to revolve on the pivotally mounted rear axle C2, which can turn horizontally by sliding under the frame N′ for steering the rear wheels. The elements *q* of the differential are respectively fixed to the ends of the tubular shafts L3 and L4 to differently drive these.

Preferably each of the shafts L1, L2, L3, L4 is provided with a bevel pinion M′, meshing with a bevel gear O′ on the under side of a wheel P′, which has an operating side traction face opposite and spaced from the lower side traction face of a similar wheel Q′, which wheels are spaced from each other by intermediate idler rollers R′.

Preferably the edge traction rollers S4 are fixed respectively to the outer ends of the diagonal shafts E1, E2, E3, E4 (which shafts are respectively driven from the transmission P by the rollers D1, D2, D3, D4) and the rollers S4 enter between and tractionally engage the faces of the wheels P′ and Q′ respectively, so that through them each wheel B1, B2, B3, B4 is individually driven from the wheel F′, the parts being proportioned and disposed to make their speed of drive correspond with that of the differential in its normal operation so that the driving effect of the latter and of each individual wheel is cumulative and normally identical in speed and direction when the four wheels are all of like diameter, or will be suitably varied in case any of the wheels are of unlike diameter.

In the vehicle shown uniform positioning of the front and rear axles so that these shall move properly, is preferably done by equaling means Z′, which preferably consists of diagonal tierods each extending from a point at one side of the king pin of the front axle to a point equally distant from the other side of the king pin of the rear axle, which rods are proportioned and disposed to insure prompt and equal reciprocal movement of the front and rear axles in steering, so that the stress of the steering worm may be applied to the front axle and will be transmitted from it to reversely operate the rear axle, these rods being duplicated to balance the strains on each side of the king pins.

In operation when for any cause either rear wheel should skid or slip the resulting rotation of the differential pinions will cause the skid governor I′ to instantly act to resist rotation of the pinions and to tend to compel both rear wheels to revolve together.

It will be understood that my invention provides improvements which can be readily and advantageously availed of in whole or in part in any suitable or desired manner, and that the invention is not limited to the particular details of construction, arrangement or use, nor to the particular combination, herein set forth as embodying the preferred form of my present improvements, since any of these may be modified as circumstances or the judgment of those skilled in the art may dictate without departing from the spirit of my invention.

One such modification is shown in Figs. 4 and 5 in which the differential wheel *q*3 is fixed on its tubular axle L3, and the differential wheel *q*4 is fixed on its tubular axle L4, and these wheels and the orbital pinion *r*4 are toothed gears instead of having tractional driving faces, the parts in other respects being similar to those before described and bearing the same letters of reference.

Preferably the axle stud *s* is non-rotatively mounted in and revolves with the master member J′, and the lock *u*′ is axially slidable on and non-rotative relatively to the stud, and the centrifugal locking and restraining levers *t* are rotatable and revoluble and are fulcrumed on the orbital pinion to swing on an axis transverse of its axis, and engage the lock by a rotation permitting connection. This may be accomplished in any suitable manner, but I prefer to form the stud with a recess notch or slot $a'$, and to provide the lock with a pin or projection $b'$ entering such recess so that the side faces of the recess and pin afford rotation resisting faces permitting movement of the lock axially of the stud, and I prefer to form the lock with a peripheral groove $c'$ affording an actuating face $d'$ and a restraining face $e'$, and to provide each lever $t$ with a short locking end $f'$ entering between and making a rotative connection with these faces, and with a right angle long or weight end $g'$, and to fulcrum each lever to swing on an axis $h'$ which is preferably transverse of the axis of the stud $s$, and to provide the short end of the lever with a retardation effecting face $k'$ and a retardation restraining face $l'$. Any rotation resisting means may be provided, but I prefer to form the pinion with an annular female recess or tapering clutch face $i'$ and the clutch with an annular male projection or tapering clutch face $j'$, which faces preferably frictionally engage axially to retard differentiation and disengage axially to prevent such retardation.

Any of the wheels and rollers of the differential may be gears instead of frictional members, and my invention includes using my improvements with a toothed differential pinion.

The retarding differential may be used with any known construction, and my invention includes providing means for resisting differential revolution, or centrifugal means for controlling such means, or both, between the driven members and preferably inwardly of the differential pinion to retard or resist such revolution.

What I claim is:

1. In combination, members relatively revoluble about the same axis and each having a driving face opposite and spaced from that of the other, a member revoluble about said axis and rotatable about an axis radially thereof and having a driving face between and engaging said driving faces, to revolve said first members and to rotate about its radial axis to permit differential revolution of said first members, means for revolving said second member about the axis of said first members, and centrifugally restrained rotation retarding resistance means for retarding such rotation of said second member revolving around said first axis and centrifugally restrained by such revolution from such retardation during normal revolution of said first members.

2. In combination, members revolving about an axis and each having a driving face opposite and spaced from that of the other, a member revolving about said axis and rotatable about another axis and having a driving face between and engaging said faces for revolving said first members and permitting differential revolution thereof, means for revolving said second member about the axis of said first members, and centrifugally restrained swinging resistance means for retarding such differential revolution swingingly mounted as to and revolving around said first axis and centrifugally restrained by such revolution from such retardation during normal revolution of said first members.

3. In combination, members revolving about the same axis and each having a driving face opposite and spaced from that of the other, a member revolving about said axis and rotatable about an axis radially thereof and having a driving face between and in driving engagement with said faces for revolving said first members together and permitting their differential revolution, means for revolving said second member about the axis of said first members to revolve the latter together, and centrifugally restrained pivotally mounted resistance means for retarding such differential revolution pivoted on an axis angular to said radial axis and revolving around said first axis and centrifugally restrained by such revolution from such retardation during normal revolution of said first members.

4. In combination, members revolving about the same axis and each having a driving face opposite and spaced from that of the other, a member revolving about said axis and rotatable about an axis radially thereof and having a driving face between and in driving engagement with said faces for revolving said first members together and permitting their differential revolution, means for revolving said second member about the axis of said first members to revolve the latter together, and centrifugally restrained axially movable resistance means for retarding such differential revolution movable axially of said second member and revolving around said first axis and centrifugally restrained by such revolution from such retardation during normal revolution of said first members.

5. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained automatically retarding resistance means for retarding such differential revolution revolving around said first axis and centrifugally restrained by such revolution from such retardation during normal revolution of said first members.

6. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally radially restrained automatically retarding resistance means for retarding such differential revolution revolving around and movable radially of said first axis and centrifugally restrained by such revolution from such retardation during normal revolution of said first members.

7. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained centrifugally applied resistance means for retarding such differential revolution revolving around said first axis and centrifugally restrained by such revolution from such retardation during normal revolution of said first members.

8. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained resistance means for retarding such differential revolution mounted between said first members and revolving around said first axis and centrifugally restrained by such revolution from such retardation during normal revolution of said first members.

9. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained resistance means for retarding such differential revolution carried by said means for revolving said second member and revolving around said first axis and centrifugally restrained by such revolution from such retardation during normal revolution of said first members.

10. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained second member retarding resistance means for retarding such differential revolution resisting such rotation of said second member and revolving around said first axis and centrifugally restrained by such revolution from resisting such rotation during normal revolution of said first members.

11. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained revoluble and rotatable resistance means for retarding such differential revolution revolving around said first axis and centrifugally restrained by such revolution from such retardation during normal revolution of said first members and rotatable about an axis radially of said first axis for retardation of such differentiation during differential revolution of said first members.

12. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained revoluble and rotatable centrifugally acting resistance means for retarding such differential revolution revolving around said first axis and centrifugally restrained by such revolution from such retardation during normal revolution of said first members and rotating around another axis and centrifugally actuated by such rotation for retardation of such differentiation during differential revolution of said first members.

13. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained axially movable resistance means for retarding such differential revolution disposed axially of and movable axially of such axis and revolving around said first axis and centrifugally restrained by such revolution from such retardation during normal revolution of said first members.

14. In combination, members revolving about the same axis and each having a driving face opposite and spaced from that of the other, a member revolving about said axis and rotatable about an axis radial of said axis and having a driving face between and engaging said faces to revolve said first members and rotatable about said radial axis to permit differential revolution of said first members, means for revolving said second member about said first axis, and centrifugally restrained radially axially movable resistance means for retarding such differential revolution disposed axially of and movable axially of said radial axis and revolving around said first axis and centrifugally restrained by such revolution from such retardation during normal revolution of said first members.

15. In combination, members revolving about the same axis and each having a driving face opposite and spaced from that of the other, a member revolving about said axis and rotatable about an axis radially of said axis and having a driving face between and engaging said driving faces to revolve said first members and rotatable about said radial axis to permit differential revolution of said first members, means for revolving said second member about said first axis, centrifugally restrained resistance means for retarding such differential revolution, and centrifugal restraining and centrifugal retardingly actuating means revolving around said first axis and centrifugally affected by such revolution for restraining said resistance means during normal revolution of said first members and centrifugally retardingly actuating said resistance means during differential revolution of said first members.

16. In combination, members revolving about the same axis and each having a driving face opposite and spaced from that of the other, a member revolving about said axis and rotatable about an axis radially of said axis and having a driving face between and engaging said driving faces to revolve said first members and rotatable about said radial axis to permit differential revolution of said first members, means for revolving said second member about said first axis, and radially inward resistance means for retarding such differential revolution disposed radially inwardly of said second member.

17. In combination, members revolving about the same axis and each having a driving face opposite and spaced from that of the other, a member revolving about said axis and rotatable about an axis radially of said axis and having a driving face between and engaging said driving faces to revolve said first members and rotatable about said radial axis to permit differential revolution of said first members, means for revolving said second member about said first axis, and inwardly intermediate resistance means for retarding such differential revolution disposed inwardly of said driving faces and intermediate of said first members.

18. In combination, members revolving about the same axis and each having a driving face opposite and spaced from that of the other, a member revolving about said axis and rotatable about an axis radially of said axis and having a driving face between and engaging said driving faces to revolve said first members and rotatable about said radial axis to permit differential revolution of said first members, means for revolving said second member about said first axis, and axially movable intermediate restraining means for retarding such differential revolution movable axially of one of said axes and intermediate of said first members.

19. In combination, members revolving about the same axis and each having a driving face opposite and spaced from that of the other, a member revolving about said axis and rotatable about an axis radially of said axis and having a driving face between and engaging said driving faces to revolve said first members and rotatable about said radial axis to permit differential revolution of said first members, means for revolving said second member about said first axis, and radially movable resisting means for retarding such differential revolution movable radially of and disposed intermediate of said first members.

In witness whereof, I have hereunto signed my name.

GEORGE HOLT FRASER